Figure 1:
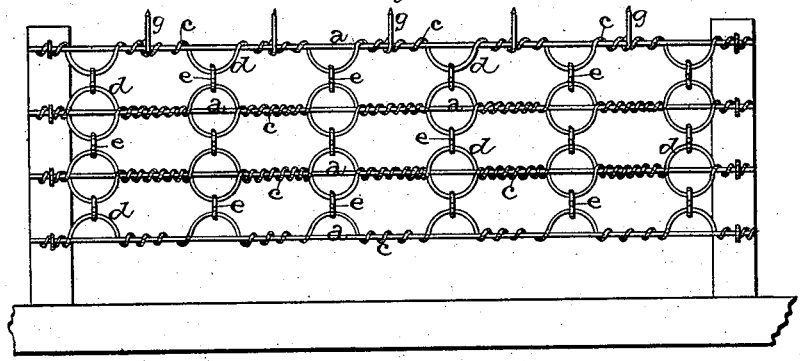
Figure 2:
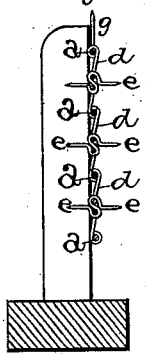
Figure 3:
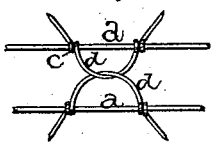

F. L. BESTOR.
Barb for Wire-Fence.

No. 197,757.  Patented Dec. 4, 1877.

WITNESSES.

INVENTOR.

UNITED STATES PATENT OFFICE.

FRANCIS L. BESTOR, OF OSKALOOSA, IOWA, ASSIGNOR OF ONE-THIRD HIS RIGHT TO VINCEN PARDUN, OF SAME PLACE.

IMPROVEMENT IN BARBS FOR WIRE FENCES.

Specification forming part of Letters Patent No. 197,757, dated December 4, 1877; application filed October 12, 1877.

*To all whom it may concern:*

Be it known that I, FRANCIS L. BESTOR, of Oskaloosa, in the county of Mahaska and State of Iowa, have invented certain new and useful Improvements in Barbs for Wire Fences; and I do hereby declare the following to be a full, clear, and exact description of the invention, such as will enable others skilled in the art to which it pertains to make and use it, reference being had to the accompanying drawings, which form part of this specification.

My invention relates to an improvement in wire fences and barbs for wire fences; and it consists in the manner of wrapping wires around the wires that form the fence, for the purpose of fastening on the barbs, and in the peculiar formation of the barbs themselves, as will be more fully described hereinafter.

The accompanying drawings represent my invention.

$a$ represent the wires that form my fence proper. Wrapped around these wires $a$ are the wires $c$, which, as will be seen, are wrapped closely around the wires $a$ for a suitable distance, and then form a loop, $d$. These loops extend above and below the wires, as shown. As two of them always come together, they form the means of fastening the barbs $e$ to the fence. These barbs project some distance beyond the sides of the fence in both directions, and are formed in the shape of double U's, each letter being reversed in relation to the other.

Each curve of the barb catches under or over one of the loops, as shown, and as the two ends of the barbs project outward some distance beyond the sides of the fence, they will keep all animals from leaning or bearing against the wires, and thus prevent them from being bent or broken.

In order to prevent animals from getting in between the barbs $e$, which are here shown arranged in vertical lines, other barbs $g$ may be fastened, not only to the top wires, but to the lower ones, being arranged in between the barbs $e$.

By means of the wires $c$ the fence is made not only stronger and more efficient, but enables barbs to be attached to it in between the wires $a$, where they are more efficient in protecting the fence than where generally applied. Another great advantage gained by thus forming my barb is, that the fence is not only made more ornamental, but it is so much more plainly seen that there is no danger of animals running against it.

If so preferred, the loops may each be made separate, and then their ends will form four barbs, as shown.

Having thus described my invention, I claim—

1. The wires $c$, applied to a wire fence so as to form the loops $d$, substantially as shown.
2. The combination of the wires $a$, wires $c$, wrapped around them and forming the loops $d$, barbs $e$, applied to the loops, and barbs $g$, substantially as described.

In testimony that I claim the foregoing I have hereunto set my hand.

FRANCIS L. BESTOR.

Witnesses:
   D. G. WHITE,
   J. S. CARROLL.